United States Patent Office 3,836,534
Patented Sept. 17, 1974

3,836,534
5-PIPERAZINO-6-HYDROXY-5H-BENZO-
CYCLOHEPTENES
Alexander E. Drukker, Milwaukee, and Claude I. Judd,
Mequon, Wis., assignors to Colgate-Palmolive Company, New York, N.Y.
No Drawing. Continuation-in-part of abandoned application Ser. No. 821,148, May 1, 1969. This application Aug. 16, 1971, Ser. No. 172,193
Int. Cl. C07d 51/70
U.S. Cl. 260—268 BC                2 Claims

ABSTRACT OF THE DISCLOSURE

The compounds are 5-amino-6-hydroxy-6,7,8,9-tetrahydro-5H-benzocycloheptenes which are useful as chemical intermediates and as central nervous system stimulants. A compound disclosed is 5-isopropylamino-6-hydroxy-6,7,8,9-tetrahydro-5H-benzocycloheptene.

RELATED CASE

This application is a continuation-in-part of our earlier application Ser. No. 821,148, filed May 1, 1969 now abandoned.

DETAILED DESCRIPTION

The compounds of the present invention may be represented by the following formula:

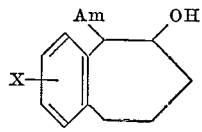

in which X is selected from hydrogen, lower alkoxy of 1 to 4 carbon atoms such as methoxy, ethoxy or propoxy, halo such as chloro, bromo or fluoro and trifluoromethyl, and Am is a group selected from (a)

in which $R_1$ and $R_2$ are the same or different groups selected from hydrogen, a lower alkyl of 1 to 4 carbon atoms such as methyl, ethyl or isopropyl, a hydroxy-lower alkyl such as hydroxymethyl or hydroxyethyl, a lower acyl group such as acetyl, benzoyl and phenyl-lower alkyls of 7 to 13 carbon atoms such as benzyl, phenethyl and phenylisopropyl, or (b) Groups in which

represents an amino group such as morpholino, pyrrolidino, piperidino, N-lower alkyl piperazino groups such as N-methyl-piperazino, N-(phenyl-lower alkyl)piperazino groups such as N-benzyl-piperazino and N-(hydroxy-lower alkyl)piperazino groups such as 4-(beta-hydroxyethyl)piperazino.

The novel compounds of the present invention are preferably prepared from starting materials which may be represented by the following formula:

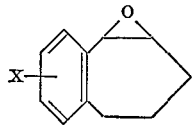

Representative of the starting materials which can be employed are the following:

5,6-epoxy-6,7,8,9-tetrahydro-5H-benzocycloheptene,
2 - chloro - 5,6-epoxy-6,7,8,9-tetrahydro-5H-benzocycloheptene,
3 - fluoro - 5,6-epoxy-6,7,8,9-tetrahydro-5H-benzocycloheptene,
2 - methoxy - 5,6-epoxy - 6,7,8,9 - tetrahydro-5H-benzocycloheptene,
3 - trifluoromethyl - 5,6 - epoxy - 6,7,8,9-tetrahydro-5H-benzocycloheptene.

The above 5,6 - epoxy - 6,7,8,9-tetrahydro-5H-benzocycloheptenes are old compounds and may be prepared as described in the literature. (T. A. Crabb et al., *Journal of the Chemical Society, 1958,* page 4276.)

The compounds of the present invention are preferably prepared by reacting a selected 5,6-epoxy derivate with ammonia or an amine. The reaction is preferably conducted in an organic solvent such as benzene, at temperatures of 110° to 170° C. in an autoclave.

The process may be illustrated as follows:

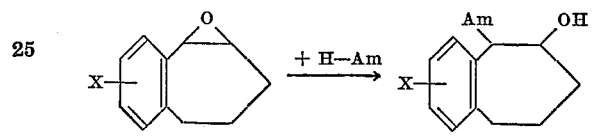

Representative of the amines that may be employed in the reaction are the following:

ammonia,
methylamine,
benzylamine,
dimethylamine,
methylbenzylamine,
piperidine,
4-substituted piperazine, and
morpholine.

Representative of the compounds which may be prepared by the described process are the following:

5 - amino - 6-hydroxy-6,7,8,9-tetrahydro-5H-benzocycloheptene,
5 - (N-methyl-N-2-hydroxyethyl)amino-6-hydroxy-6,7,8,9-tetrahydro-5H-benzocycloheptene,
5 - dimethylamino-6-hydroxy-6,7,8,9-tetrahydro-5H-benzocycloheptene,
5 - (1 - methyl-4-piperazinyl)-6-hydroxy-6,7,8,9-tetrahydro-5H-benzocycloheptene,
5 - isopropylamino-6-hydroxy-6,7,8,9-tetrahydro-5H-benzocycloheptene, and
5 - methylamino-6-hydroxy-6,7,8,9-tetrahydro-5H-benzocycloheptene.

Those compounds in which $R_1$ or $R_2$ is acyl may be prepared by treating the corresponding primary or secondary amine derivative with an acylating agent, such as benzoyl chloride, in the presence of pyridine. The process may be illustrated as follows:

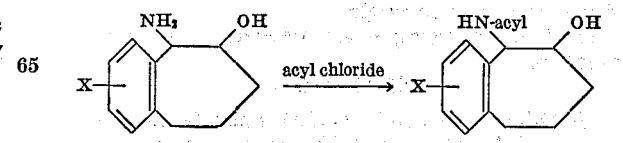

in which X does interfere with or partake in the reaction.
Representative of the acylating agents which may be employed are the following:

acetyl chloride,
acetyl bromide,
propionyl chloride,
N-butyryl chloride, and
benzoyl chloride.

Examples of some of the 5-acylamino-6-hydroxy-6,7,8,9-tetrahydro-5H-benzocycloheptenes thus prepared are 5 - acetylamino - 6-hydroxy-6,7,8,9-tetrahydro-5H-benzocycloheptene,
5 - propionylamino-6-hydroxy-6,7,8,9-tetrahydro-5H-benzocycloheptene,
5 - n-butyrylamino-6-hydroxy-6,7,8,9-tetrahydro-5H-benzocycloheptene, and
5 - benzoylamino-6-hydroxy-6,7,8,9-tetrahydro-5H-benzocycloheptene.

The compounds of the present invention are useful as intermediates in the preparation of more complex chemical compounds. For example, the thiocyanic acid addition salts of the compounds may be condensed with formaldehyde to form resinous materials useful as pickling agents as described in U.S. Pats. 2,425,320 and 2,606,155. The compounds may also be used in the form of their fluosilicic acid addition salts as mothproofing agents as described in U.S. Pats. 1,915,334 and 2,075,359.

The compounds have also been found to have utility as central nervous system stimulants. In mouse behavioral studies the following compounds were found in 10 mg./kg. intraperitoneal doses to cause a stimulation of the central nervous system:

5 - (N-methyl-N-2-hydroxyethyl)amino-6-hydroxy-6,7,8,9-tetrahydro-5H-benzocycloheptene,
5 - (1 - methyl-4-piperazinyl)-6-hydroxy-6,7,8,9-tetrahydro-5H-benzocycloheptene,
5 - amino - 6-hydroxy-6,7,8,9-tetrahydro-5H-benzocycloheptene,
5 - amino - 6-hydroxy-6,7,8,9-tetrahydro-5H-benzocycloheptene, and
5 - benzoylamino-6-hydroxy-6,7,8,9-tetrahydro-5H-benzocycloheptene.

When employed as pharmaceutical agents the compounds are preferably used in the form of acid addition salts. Such acid addition salts may be conveniently prepared by simply contacting the compounds with a suitable acid in a mutual solvent and then removing the solvent to obtain the desired salt. Examples of acid which may be employed are hydrochloric acid, succinic acid, tartaric acid, benzoic acid or fumaric acid.

Quarternary ammonium salts of the compounds may be formed by conventional techniques employing a suitable alkylating agent such as methyl chloride, methyl iodide or ethyl bromide.

Pharmaceutical dosage forms containing the active ingredients are generally prepared by combining the active ingredient or ingredients with a major amount of one or more suitable pharmaceutical diluents and then forming the resulting mixture into unit dosage forms suitable for oral or parenteral administration.

The unit dosage forms will generally contain from 5 to 250 mg. of the active ingredients. One or more of such units may be administered daily depending upon the patient's physical size and the severity of the condition being treated. However, generally the daily dosage will not exceed 100 mg. of the active ingredient per kilogram of the patient's body weight.

The following examples are presented to illustrate the invention:

EXAMPLE 1

5-(N-Methyl-N-2-hydroxyethyl)amino-6-hydroxy-6,7,8,9-tetrahydro-5H-benzocycloheptene A mixture of 8 g. (0.05 mole) of 5,6-epoxy-6,7,8,9-tetrahydro - 5H - benzocycloheptene and 5.63 g. (0.075 mole) of methylaminoethanol is heated to 170° for 4.5 hours. The viscous liquid is distilled to yield 5-(N-methyl-N - 2-hydroxyethyl)amino-6-hydroxy,6,7,8,9-tetrahydro-5H-benzocycloheptene, b.p. 180° (0.1 mm.).

Analysis—Calcd. for $C_{14}H_{21}NO_2$: C, 71.45; H, 9.00; N, 5.95. Found: C, 71.82; H, 9.21; N, 5.85.

EXAMPLE 2

5-Dimethylamino-6-hydroxy-6,7,8,9-tetrahydro-5H-benzocycloheptene

A solution of 8 g. (0.05 mole) of 5,6-epoxy-6,7,8,9-tetrahydro-5H-benzocycloheptene in 50 ml. of benzene containing 5 g. (0.08 mole) of dimethylamine is heated 4 hours in an autoclave at 150°. The reaction mixture is concentrated and distilled to yield 5-dimethylamino-6-hydroxy - 6,7,8,9-tetrahydro-5H-benzocycloheptene, b.p. 100° (0.15 mm.), m.p. 68–69°.

Analysis—Calcd. for $C_{13}H_{19}NO$: C, 76.04; H, 9.30; N, 6.82. Found: C, 76.12; H, 8.85; N, 6.72.

EXAMPLE 3

5-Isopropylamino-6-hydroxy-6,7,8,9-tetrahydro-5H-benzocycloheptene

A solution of 24 g. (0.15 mole) of 5,6-epoxy-6,7,8,9-tetrahydro-5H-benzocycloheptene and 11.8 g. (0.2 mole) of isopropylamine in 150 ml. of benzene is heated 4 hours in an autoclave at 150°, cooled, concentrated, and the residue recrystallized from 100 ml. of hot acetonitrile to give 5 - isopropylamino-6-hydroxy-6,7,8,9-tetrahydro-5H-benzocycloheptene, m.p. 108–113°. Furthermore recrystallizations from acetonitrile increases the melting point to 112–115°.

Analysis.—Calcd. for $C_{14}H_{21}NO$: C, 76.66; H, 9.66; N, 6.39. Found: C, 76.65; H, 9.77; N, 6.32.

EXAMPLE 4

5-(1-Methyl-4-piperazinyl)-6-hydroxy-6,7,8,9-tetrahydro-5H-benzocycloheptene

A solution of 16 g. (0.1 mole) of 5,6-epoxy-6,7,8,9-tetrahydro-5H-benzocycloheptene and 15 g. (0.1 mole) of 1-methylpiperazine in 100 ml. of benzene is heated 4 hours to 150° in an autoclave. The reaction mixture is concentrated and distilled to give 5-(1-methyl-4-piperazinyl)-6-hydroxy-6,7,8,9-tetrahydro-5H-benzocycloheptene in the form of a viscous oil, b.p. 143–158° (0.1 mm.). Dihydrochloride: The salt is prepared by passing anhydrous hydrochloric acid through an ethereal solution of the base. The melting point of the salt is 233° (0.1 mm.).

Analysis.—Calcd. for $C_{16}H_{26}Cl_2N_2O$: C, 57.66; H, 7.86; N, 8.40. Found: C, 58.03; H, 7.79; N, 8.53.

EXAMPLE 5

5-Amino-6-hydroxy-6,7,8,9-tetrahydro-5H-benzocycloheptene

A mixture of 24 g. (0.15 mole) of 5,6-epoxy-6,7,8,9-tetrahydro-5H-benzocycloheptene, 25 g. of sodium azide, 1 liter of dioxane and 250 ml. of water are stirred and refluxed for 48 hours under nitrogen. Part of the dioxane is removed by distillation, the mixture is diluted with water and extracted with ether. The ethereal extracts are washed with water, dried over potassium carbonate, filtered, and concentrated to yield the crude azide carbinol in the form of a yellow brown oil. Part of this (10.15 g.) is dissolved in 225 ml. of ethanol, some gray precipitate is filtered off, and to the filtrate is added 100 mg. of platinum oxide. The solution is hydrogenated for 2 hours at room temperature and 60 lbs. pressure, the catalyst is removed by filtration and the filtrate concentrated. The residue is redissolved in warm benzene, washed with water, dried shortly over sodium sulfate, filtered and concentrated. The residue is recrystallized from 100 ml. of hot ethanol to yield 5-amino-6-hydroxy-6,7,8,9-tetrahydro-5H-benzocycloheptene, m.p. 161–162°.

Analysis.—Calcd. for $C_{11}H_{15}NO$: C, 74.54; H, 8.53; N, 7.90. Found: C, 74.18; H, 8.62; N, 7.79.

EXAMPLE 6

5-Benzoylamino-6-hydroxy-6,7,8,9-tetrahydro-5H-benzocycloheptene

To a slurry of 14 g. (0.079 mole) of 5-amino-6-hydroxy-6,7,8,9-tetrahydro-5H-benzocycloheptene in 300 ml. of pyridine is added dropwise 11.9 g. (0.085 mole) of benzoyl chloride. The mixture is stirred 1 hour at room temperature, quenched in water, filtered off, and recrystallized from methanol to yield 5-benzoylamino-6-hydroxy-6,7,8,9-tetrahydro-5H-benzocycloheptene, m.p. 217°.

*Analysis.*—Calcd. for $C_{18}H_{19}NO_2$: C, 76.84; H, 6.81; N, 4.98. Found: C, 76.72; H, 7.03; N, 4.97.

We claim:

1. The compound 5-(1-methyl-4-piperazinyl)-6-hydroxy-6,7,8,9-tetrahydro-5H-benzocycloheptene and pharmaceutically acceptable acid addition salts thereof.

2. The compound of claim 1 which is 5-(1-methyl-4-piperazinyl)-6-hydroxy-6,7,8,9-tetrahydro-5H-benzocycloheptene.

References Cited

UNITED STATES PATENTS

| | | | |
|---|---|---|---|
| 2,700,686 | 1/1955 | Dickey et al. | 260—633 |
| 3,458,577 | 7/1969 | Galantay | 260—571 |
| 3,651,143 | 3/1972 | Galantay | 260—268 BC |

OTHER REFERENCES

Khanna et al, Indian Jour. Chem., vol. 6, pp. 6–10 (1968).

Khanna et al., Chem. Abstr., vol. 68, la. 87060v (1968).

DONALD G. DAVIS, Primary Examiner

U.S. Cl. X.R.

260—247.5 B, 29362, 326.5 C, 348 C, 558 R, 562 R, 570.5 R; 424—248, 250, 267, 742, 330